United States Patent Office 3,246,461
Patented Apr. 19, 1966

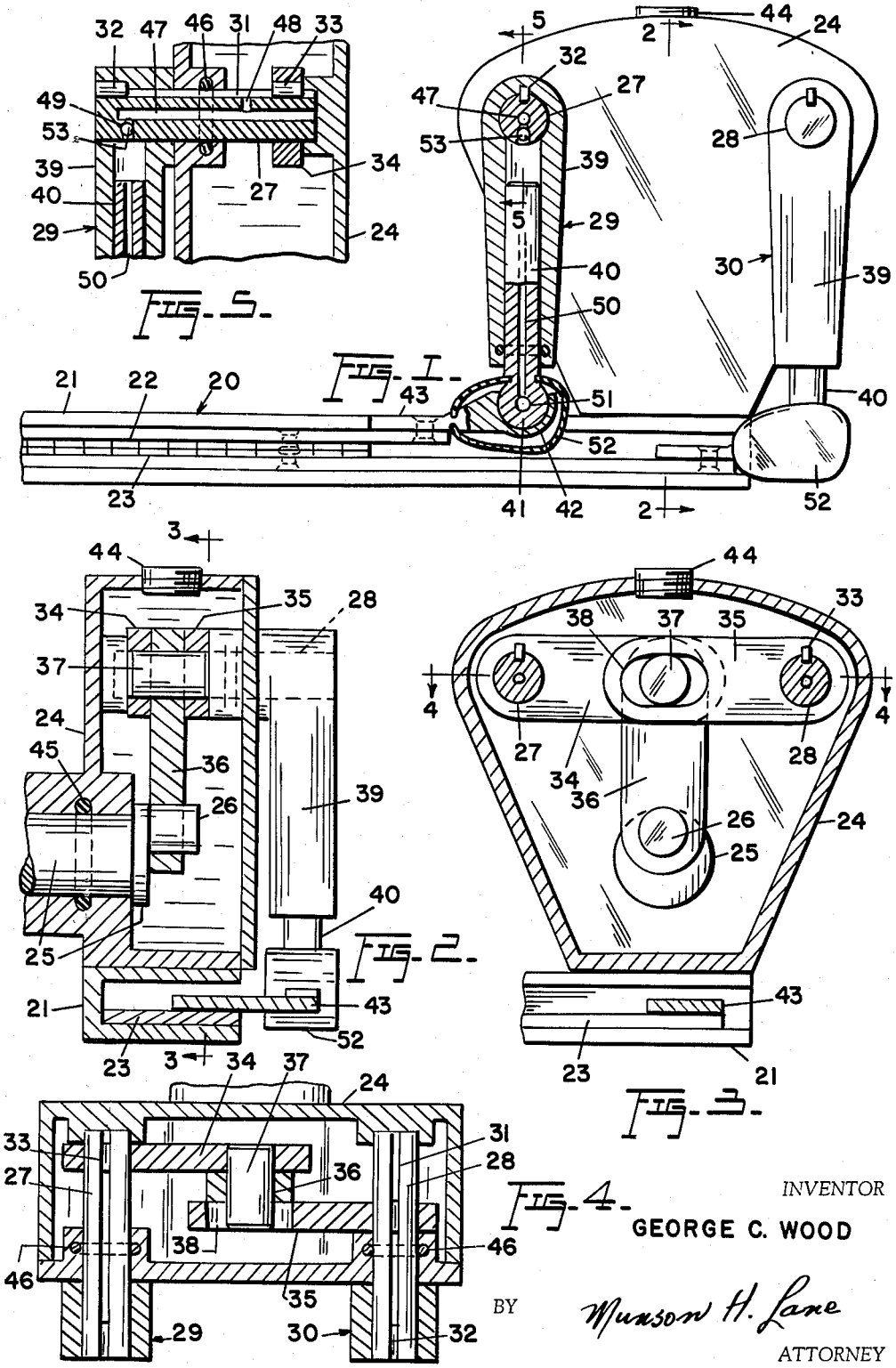

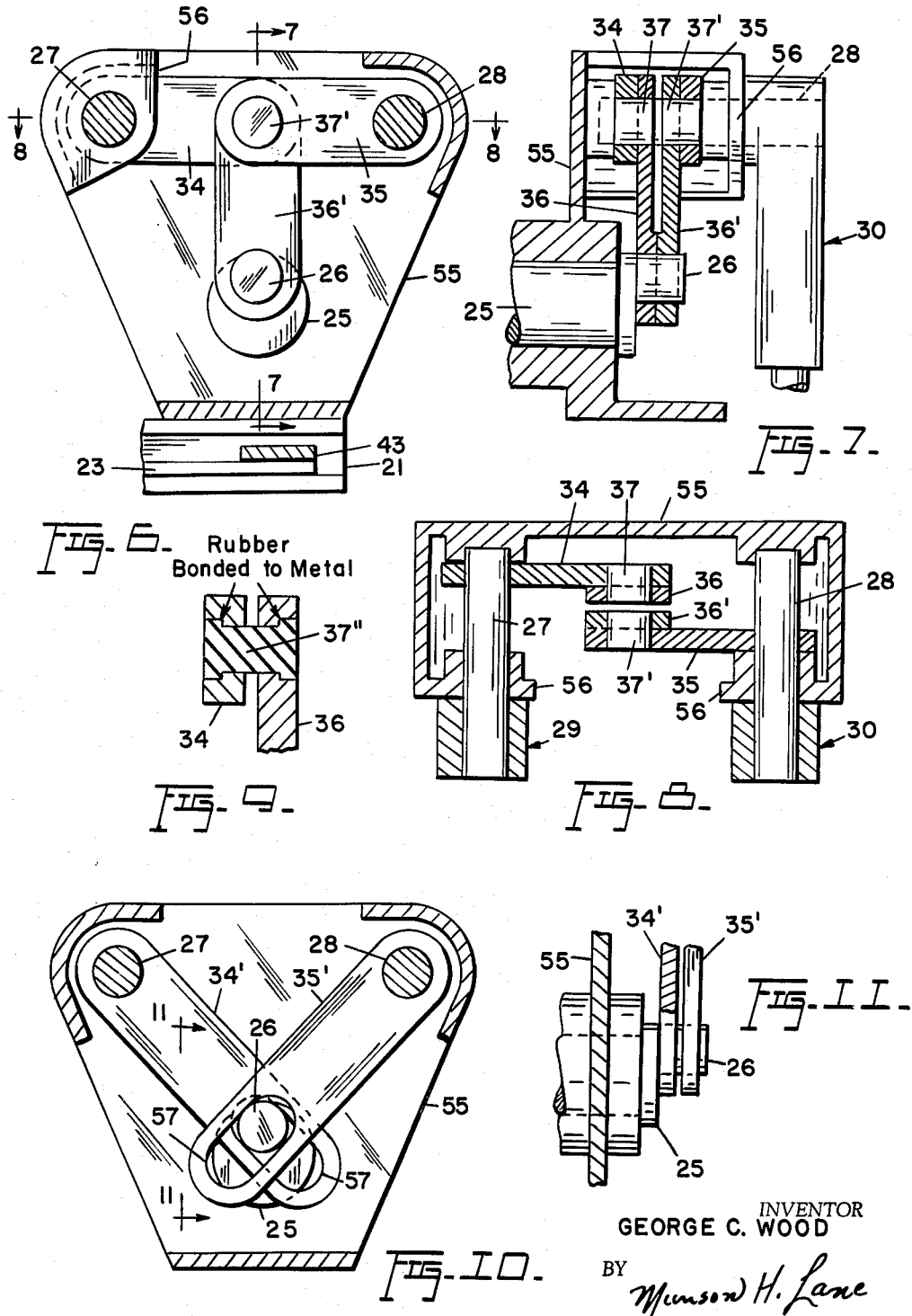

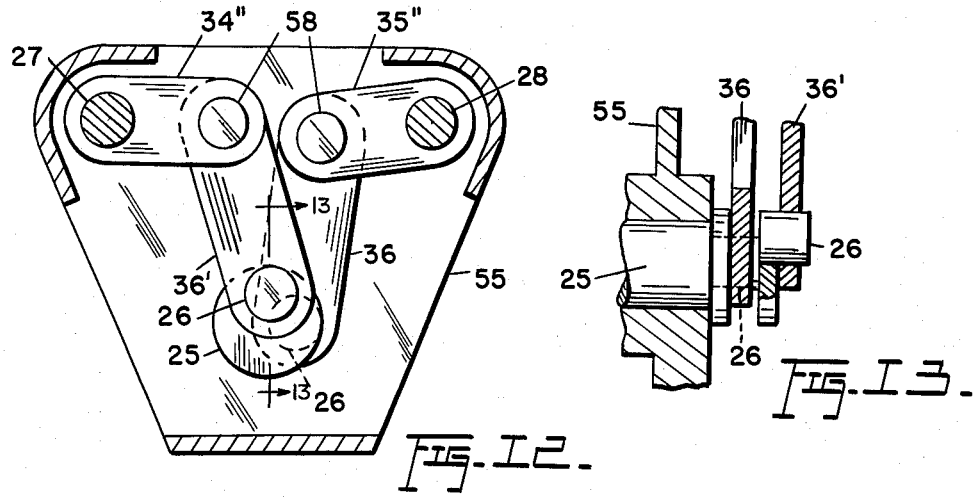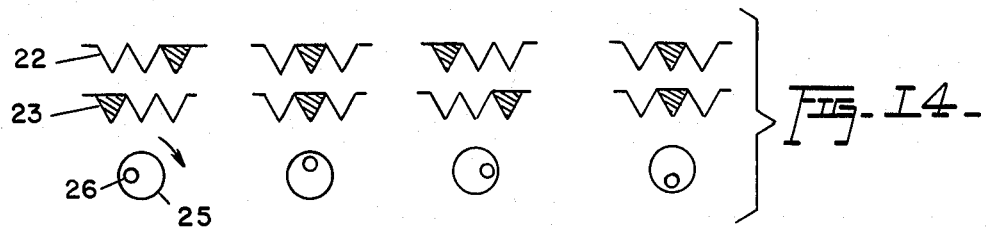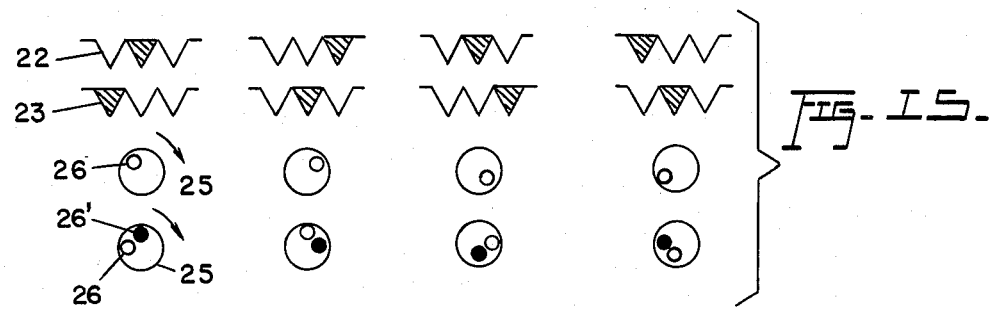

3,246,461
MOWING MACHINES
George C. Wood, % Darf Corp., Edenton, N.C.
Filed June 2, 1964, Ser. No. 371,914
12 Claims. (Cl. 56—297)

This invention relates to new and useful improvements in mowing machines, and in particular the invention concerns itself with double sickle type mowing machines wherein a pair of reciprocable sickle bars are provided in superposed relation.

The principal object of the invention is to provide improved, highly efficient and dependable means for reciprocating such sickle bars by conversion of a rotary movement of a drive shaft into the desired reciprocating movement of the sickle bars.

One important feature of the invention resides in the provision of various embodiments of the rotary to reciprocating movement converting means, whereby the two reciprocating sickle bars may be actuated in a predetermined coordination or sequence, depending upon the structural arrangement of the embodiment utilized.

Another important features resides in the particular structure of the movement converting means per se, which utilize a minimum number of moving parts, eliminate undue friction, are positively acting, and can function for long periods without servicing.

Other objects, features and advantages of the invention will become apparent from the following description taken in conjunction with the accompanying drawings, wherein like characters of reference are used to designate like parts, and wherein:

FIGURE 1 is an elevational view, partly in section, showing one embodiment of the double sickle bar actuating means in accordance with the invention;

FIGURE 2 is a sectional view, taken substantially in the plane of the line 2—2 in FIGURE 1;

FIGURE 3 is a sectional view, taken substantially in the plane of the line 3—3 in FIGURE 2;

FIGURE 4 is a fragmentary sectional view, taken substantially in the plane of the line 4—4 in FIGURE 3;

FIGURE 5 is a fragmentary sectional view, taken substantially in the plane of the line 5—5 in FIGURE 1;

FIGURE 6 is an elevational view, partly in section, of a modified embodiment of the invention;

FIGURE 7 is a fragmentary sectional view, taken substantially in the plane of the line 7—7 in FIGURE 6;

FIGURE 8 is a sectional view, taken substantially in the plane of the line 8—8 in FIGURE 6;

FIGURE 9 is an enlarged, fragmentary sectional detail of a bonded resilient connection such as may be used between some of the moving parts;

FIGURE 10 is an elevational view, partly in section, of another modified embodiment of the invention;

FIGURE 11 is a fragmentary sectional view, taken substantially in the plane of the line 11—11 in FIGURE 10;

FIGURE 12 is an elevational view, partly in section, of another modified embodiment;

FIGURE 13 is a fragmentary sectional view, taken substantially in the plane of the line 13—13 in FIGURE 12;

FIGURE 14 is a diagrammatic illustration showing an oppositely coordinated reciprocation of the sickle bars; and FIGURE 15 is a diagrammatic illustration showing a sequentially coordinated reciprocation of the sickle bars.

Referring now to the accompanying drawings in detail, more particularly to FIGURES 1–5 inclusive, the reference numeral 20 generally designates a double sickle bar assembly of a mowing machine including a suitable elongated support 21 which slidably accommodates a pair of superposed, reciprocable sickle bars 22, 23. A holder 24, in the form of a closed housing, is suitably mounted at one end of the support 21 and accommodates means for actuating the sickle bars, in accordance with the invention.

The holder 24 provides a bearing for a drive shaft 25 which extends into the holder or housing 24 and is equipped with a crank pin 26. The housing 24 also provides bearings for a pair of rock shafts 27, 28 which, as is best shown in FIGURE 3, are disposed above and at opposite sides of the drive shaft 25. The rock shafts 27, 28 project outwardly from the housing 24 and their projecting end portions have secured thereto a pair of rocker arms 29, 30, respectively. For this purpose, the shafts 27, 28 are provided with keyways 31 having keys 32 therein to secure the rocker arms 29, 30 in place. The rock shafts 27, 28 also have secured thereto by suitable keys 33 in the keyways 31, a pair of cranks 34, 35, respectively. The cranks 34, 35 are located within the housing 24 and have spaced, overlapping free end portions, as is best shown in FIGURE 4, between which is disposed one end portion of a link 36. The crank 34 rigidly carries a pin 37 which extends rotatably through an aperture formed in the link 36 and through a registering slot 38 formed in the link 35, as shown. The other end portion of the link 36 is formed with an aperture to rotatably receive the aforementioned crank pin 26 on the shaft 25.

It will be apparent from the foregoing that when rotation is imparted to the shaft 25, movement of the crank pin 26 and link 36 will impart oscillatory or rocking movement to the cranks 34, 35, rock shafts 27, 28 and to the rocker arms 29, 30.

The rocker arms 29, 30 are similar in construction and each includes a substantially tubular outer member 39 (see FIGURE 1) which is secured to the associated rock shaft and slidably receives therein a piston-like inner member 40. The member 40 projects downwardly from the member 39 and is equipped with a ball joint 41 cooperating with a socket 42 on an attachment plate 43. The attachment plate of the ball and socket joint on the rocker arm 29 is secured to the sickle bar 22, while the corresponding plate on the rocker arm 30 is secured to the sickle bar 23. Thus, when the two rocker arms are oscillated as above described, reciprocating movement will be imparted to the two sickle bars.

The housing 24 is provided at the top thereof with a filler plug 44 whereby suitable liquid lubricant may be poured into the housing to lubricate the various moving parts therein. A sealing ring 45 is provided around the drive shaft 25 and similar rings 46 are provided around the rock shafts 27, 28 to prevent leakage of the lubricant, but it will be observed that the shafts 27, 28 are formed with longitudinal bores 47 having openings 48 in communication with the interior of the housing 24 and also having openings 49 in communication with the interior of the outer members 39 of the rocker arms 29, 30. Thus, the bores 47 and openings 48, 49 provide passages whereby lubricant from the housing 24 may flow into the rocker arm members 39 to lubricate the arm members 40 which are slidable therein. The members 40 themselves are provided with longitudinal bores 50 which extend into the balls 41 and communicate with lateral openings 51 in the balls, whereby to deliver lubricant to the ball and socket joints 41, 42. Suitable covers 52 of flexible material enclose the ball and socket joints to prevent leakage of lubricant therefrom, and if desired, suitable check valves 53 may be provided in the aforementioned openings 49 (see FIGURE 5) to prevent back flow of lubricant into the housing 24.

Attention is now invited to FIGURE 14 which diagrammatically shows coordination of the reciprocating movement of the sickle bars 22, 23 in relation to four successive positions of the crank pin 26 spaced 90° apart. The cross-hatched areas represent different positions of one particular tooth of each of the sickle bars and it will be readily apparent that, with the structure of the actuating means arranged in accordance with FIGURES 1–5, rotation of the drive shaft 25 will reciprocate the two sickle bars in relatively opposite directions from the opposite ends of their respective strokes, so that the sickle bar teeth are translated as shown. It is understood, of course, that the reciprocating strokes of the two sickle bars are of equal length.

FIGURES 6–8 illustrate a modified embodiment of the invention wherein a simple plate-shaped holder or bracket 55 is provided in place of the housing 24 to support the drive shaft 25 and the rock shafts 27, 28, the bracket 55 being equipped with suitable ears or flanges 56 so as to provide bearings for both end portions of the rock shafts, as illustrated. The crank pin 26 in this instance is provided with a pair of links 36, 36' which are connected by separate pins 37, 37', respectively, to the cranks 34 and 35. In this manner, the provision of the slot 38 in the crank 35 is unnecessary and the arrangement is particularly well suited for use where resiliently flexible bushings of rubber, or the like, are utilized in place of metallic pivot pins such as the pins 37, 37'. This is shown in detail in FIGURE 9 wherein a rubber bushing 37″ is bonded to the crank 34 and to the link 36 (and to the crank 34' and link 36') and during operation of the parts the rubber bushing is axially twisted or torsioned in the portion thereof between the parts 34, 36 so as to permit their required relative movement without the use of a rotary pivot connection and, consequently, without the need for lubrication.

It is to be noted at this point that the bonded, resiliently flexible connection of FIGURE 9 may be utilized in the crank and link arrangement of FIGS. 6–8 as well of FIGS. 1–5 already described, and also in the other modified embodiments of FIGS. 10–11 and 12–13, hereinafter to be detailed. Conversely, a rotary pivot connection such as is shown in FIGS. 1–5 may be used in the embodiments of FIGS. 6–8, 10–11 and 12–13, if so desired, especially if a lubricant housing and lubricant distribution means of the type shown in FIGS. 1–5 is provided in the other embodiments.

FIGURES 10 and 11 illustrate another modification wherein the cranks 34' and 35' on the rock shafts 27, 28 are connected directly to the crank pin 26 without the use of intermediate links (such as 34 and 34'). In such event the cranks 34', 35' are provided with slots 57 to receive the crank pin 26 directly therein, and while the arrangement of FIGS. 6–8 will cause the sickle bars to be reciprocated in the same coordination as shown in FIGURE 14 in connection with the arrangement of FIGS. 1–5, the arrangement of FIGS. 10–11 will effect sequential reciprocation of the two sickle bars as illustrated in FIGURE 15, wherein a particular tooth of one sickle bar will lead or follow a corresponding tooth of the other bar in overlapping translation, so that when one sickle bar is at the end of its reciprocating movement, the other bar will be intermediate the ends of its movement, as will be readily apparent.

The translatory movement of the sickle bars as depicted in FIGURE 15 in regard to the embodiment of FIGURES 10–11 is also applicable to the embodiment of FIGURES 12–13, wherein the cranks 34″ and 35″ on the rock shafts 27, 28 are connected by separate pivots 58 to two separate links 36, 36', in much the same manner as in the embodiment of FIGS. 6–8. However, in the embodiment of FIGS. 12–13, the links 36, 36' are connected to two separate crank pins 26, 26' provided on the drive shaft 25 and spaced apart by 90°, whereby to effect the aforementioned leading coordination of one sickle bar movement with respect to the other.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the appended claims.

What is claimed as new is:

1. In a mowing machine, the combination of a sickle bar support, a pair of superposed reciprocable sickle bars carried by said support, a holder mounted on the support, a rotatable drive shaft journalled in said holder, and means operatively connecting said drive shaft to said sickle bars for converting rotary movement of the drive shaft into reciprocating movement of the sickle bars, said means comprising a pair of rocker shafts journalled in said holder at opposite sides of and above said drive shaft a pair of rocker arms carried by the respective rocker shafts and operatively connected to the respective sickle bars, a pair of cranks secured to the respective rocker shafts in axially offset relation from said rocker arms, and crank pin means provided on said drive shaft, said cranks being operatively connected to said crank pin means.

2. The device as defined in claim 1 together with a link having one end portion thereof mounted on both said crank pin means, said cranks being pivoted to the other end portion of said link.

3. The device as defined in claim 1 together with a pair of links each having one end portion thereof mounted on said crank pin means, said cranks being connected to the other end portions of the respective links.

4. The device as defined in claim 1 wherein said cranks are provided with slots having registering slot portions directly receiving said crank pin means therein.

5. The device as defined in claim 1 wherein each of said rocker arms comprises a pair of slidably telescoped members.

6. The device as defined in claim 1 wherein said holder comprises a closed housing having said crank pin means disposed therein, said rocker shafts being journalled in and projecting outwardly from said housing, said rocker arms being secured to said rocker shafts exteriorly of the housing and said cranks being secured to the rocker shafts inside the housing, said housing being adapted to contain liquid lubricant.

7. The device as defined in claim 6 wherein each of said rocker arms comprises a pair of slidably telescoped members, together with means for delivering lubricant from said housing to said slidably telescoped members.

8. The device as defined in claim 6 wherein each of said rocker arms comprises a pair of slidably telescoped members, one member of each rocker arm being secured to the respective rocket shaft, a movable joint connecting the other member of each rocker arm to the respective sickle bar, and means for delivering lubricant from said housing to said slidably telescoped members and to said movable joints.

9. The device as defined in claim 1 wherein said crank pin means include first and second crank pins provided on said drive shaft in angularly spaced relation, and a pair of links having one end portion thereof mounted on the respective first and second crank pins, said cranks being connected to the other end portions of the respective links.

10. The device as defined in claim 2 together with resiliently flexible torsional bushing means bonded to said link and to said cranks for operatively connecting the same together.

11. The device as defined in claim 3 together with resiliently flexible torsional bushing means bonded to said links and to said cranks for operatively connecting the same together.

12. The device as defined in claim 9 together with resiliently flexible torsional bushing means bonded to said links and to said cranks for operatively connecting the same together.

References Cited by the Examiner

UNITED STATES PATENTS

| | | | |
|---|---|---|---|
| 211,122 | 1/1879 | Wilber | 56—271 |
| 2,823,506 | 2/1958 | Irving | 56—297 X |
| 3,010,268 | 11/1961 | Freeman | 56—297 X |
| 3,017,736 | 1/1962 | Hill | 56—297 |
| 3,058,288 | 10/1962 | Karg | 56—297 |
| 3,104,511 | 9/1963 | Clark | 56—296 |
| 3,108,421 | 10/1963 | Leverenz | 56—297 |
| 3,121,303 | 2/1964 | Tomilinson et al. | 56—297 |

ABRAHAM G. STONE, *Primary Examiner.*

RUSSELL R. KINSEY, *Examiner.*